(12) United States Patent
Huang et al.

(10) Patent No.: US 9,253,116 B2
(45) Date of Patent: Feb. 2, 2016

(54) MULTI-MEDIA DATA RATE ALLOCATION METHOD AND VOICE OVER IP DATA RATE ALLOCATION METHOD

(71) Applicant: National Taiwan University, Taipei (TW)

(72) Inventors: Polly Huang, Taipei (TW); Chien-Nan Chen, Taipei (TW); Cing-Yu Chu, Taipei (TW); Su-Ling Yeh, Taipei (TW)

(73) Assignee: NATIONAL TAIWAN UNIVERSITY, Taipei (TW)

( * ) Notice: Subject to any disclaimer, the term of this patent is extended or adjusted under 35 U.S.C. 154(b) by 43 days.

(21) Appl. No.: 13/924,045

(22) Filed: Jun. 21, 2013

(65) Prior Publication Data

US 2014/0192799 A1    Jul. 10, 2014

(30) Foreign Application Priority Data

Jan. 10, 2013  (TW) .............................. 101148446 A (51) Int. Cl.
*H04L 12/66* (2006.01)
*H04L 12/927* (2013.01)
*H04L 12/811* (2013.01)
*H04L 12/911* (2013.01)

(52) U.S. Cl.
CPC .............. *H04L 47/808* (2013.01); *H04L 47/38* (2013.01); *H04L 47/72* (2013.01); *H04L 47/823* (2013.01)

(58) Field of Classification Search
CPC ..... H04L 47/808; H04L 47/823; H04L 47/72; H04L 47/38
USPC ....................................................... 370/352
See application file for complete search history.

(56) References Cited

U.S. PATENT DOCUMENTS

| 5,982,780 | A  | * | 11/1999 | Bohm ................. H04L 12/6418 370/450 |
| 7,903,643 | B1 |   | 3/2011  | Concepcion |
| 2004/0186716 | A1 | * | 9/2004 | Morfitt et al. ................. 704/236 |
| 2007/0297417 | A1 | * | 12/2007 | Cohen ..................... H04L 45/04 370/395.42 |
| 2008/0263012 | A1 | * | 10/2008 | Jones ................. G06F 17/30811 |
| 2010/0023623 | A1 | * | 1/2010 | Saffre et al. ................... 709/226 |
| 2010/0067432 | A1 |   | 3/2010 | Baptista et al. |
| 2010/0142458 | A1 | * | 6/2010 | Mark .................. H04W 52/143 370/329 |
| 2011/0255490 | A1 | * | 10/2011 | Chuck et al. .................. 370/329 |
| 2012/0075134 | A1 | * | 3/2012 | Rogers ................. H03M 1/128 341/155 |
| 2012/0106342 | A1 |   | 5/2012 | Sundararajan et al. |
| 2012/0188894 | A1 | * | 7/2012 | Huschke ............... H04L 1/0002 370/252 |
| 2013/0094858 | A1 | * | 4/2013 | Raponi et al. ................... 398/59 |
| 2013/0318253 | A1 | * | 11/2013 | Kordasiewicz et al. ...... 709/231 |
| 2014/0140516 | A1 | * | 5/2014 | Taleb et al. ..................... 381/23 |

FOREIGN PATENT DOCUMENTS

TW        I255625 B      5/2006
TW        201225610 A1   6/2012

* cited by examiner

*Primary Examiner* — Asad Nawaz
*Assistant Examiner* — Syed S Ali
(74) *Attorney, Agent, or Firm* — Huffman Law Group, PC (57) ABSTRACT

A multimedia bitrate adaption method for individual users wherein only a set of predetermined bitrates may be selected as the multimedia bitrate of the user. The predetermined bitrates are quantized into exponentially distributed levels, and the users' experiences corresponding to the predetermined bitrates are with the same intervals, thereby increasing the service capacity and improving user satisfaction.

9 Claims, 8 Drawing Sheets

MULTI-MEDIA DATA RATE ALLOCATION METHOD AND VOICE OVER IP DATA RATE ALLOCATION METHOD

CROSS-REFERENCE TO RELATED APPLICATION(S)

This application claims priority to Taiwan Patent Application No. 101148446, filed on Jan. 10, 2013, the disclosure of which is hereby incorporated by reference in its entirety.

BACKGROUND

1. Field of the Disclosure

The present disclosure relates to a data transmission method, and more particularly, to a multimedia data bitrate adaption method.

2. Description of the Related Art

To allocate transmission flow more effectively and fairly when internet resources, such as bandwidth, are limited, internet resources should be managed and controlled. In high speed networks that can support different service performances and demands, flexible and fair bandwidth allocations can be important. For example, for network services such as the multimedia (audio or video) data transmissions, if the bandwidth can be flexibly allocated, decay of service quality can be avoided.

The current Voice Over Internet Protocol (VoIP) is implemented using User Datagram Protocol (UDP) in a Peer-to-Peer Network (P2P Network); however, in this system it is difficult to allocate data transmission rates. Further, lacking a negotiation mechanism between users to maintain fairness of the bandwidth allocation may lead to that internet resource not being applied to maximize user perception and service satisfaction effectively. In other words, transmission rates affect the performance of network services directly, and the allocation mechanisms of the transmission rates also relate to internet resource applications such as fairness and service performance. For example, when a portion of users consume too much bandwidth to raise their own performance, the service performances and fairness of the resource allocations of the larger group may be sacrificed.

Therefore, there is a need for a data transmission allocation method that may maintain the service performances and fairness of resource allocations for a larger group.

SUMMARY

The present disclosure describes a multimedia bitrate adaption method for individual users. Under this method, only a set of predetermined bitrates may be able to be selected as the multimedia bitrate of the user. The predetermined bitrates may be exponentially distributed, and the Mean Opinion Scores (MOS) of users corresponding to the predetermined bitrates may be quantized into equal interval distributions (i.e. distributed in a proportional distribution).

In one embodiment, the multimedia data bitrate adaption method applied in a multimedia data transmission comprises estimating an available bandwidth of a user, determining a range between two adjacent predetermined bitrates that the available bandwidth is in, and setting a multimedia data bitrate of the user to be the smaller predetermined bitrate of the two adjacent predetermined bitrates, wherein the predetermined bitrates are exponentially distributed.

In one embodiment, a VoIP data bitrate adaption method applied in a multi-media data transmission comprises estimating an available bandwidth of a user, determining a range between two adjacent predetermined bitrates that the available bandwidth is in, and setting a VoIP data bitrate of the user to be the smaller predetermined bitrate of the two adjacent predetermined bitrates, wherein the predetermined bitrates are exponentially distributed.

Overall, the present disclosure describes a method of multimedia data bitrate adaption using a logarithmic relationship between the data transmission rate and corresponding user satisfactions. Accordingly, the bandwidth allocation of users replaces traditional P2P bandwidth allocations in order to raise the mean satisfaction of users and increase the number of internet service users.

The foregoing is a summary and shall not be construed to limit the scope of the claims. The operations and devices disclosed herein may be implemented in a number of ways, and such changes and modifications may be made without departing from this disclosure and its broader aspects. Other aspects, inventive features, and advantages, as defined solely by the claims, are described in the non-limiting detailed description set forth below.

BRIEF DESCRIPTION OF THE DRAWINGS

FIGS. 6($a$)-($c$) depict a simulation characteristic curve of the number of calls and the percentage of MOS for three different VoIP data bitrate adaption mechanisms, in accordance with an example embodiment of the present disclosure.

DETAILED DESCRIPTION OF EMBODIMENTS

For a more complete understanding of the present disclosure and its advantages, reference is now made to the following description taken in conjunction with the accompanying drawings, in which like reference numbers indicate like features. One of ordinary skill in the art will understand other varieties for implementing example embodiments, including those described herein. The drawings are not limited to specific scale and similar reference numbers are used for representing similar elements. As used in the disclosure and the appended claims, the terms "example embodiment," "exemplary embodiment," and "present embodiment" do not necessarily refer to a single embodiment, although it may, and various example embodiments may be readily combined and interchanged, without departing from the scope or spirit of the present disclosure. Furthermore, the terminology as used herein is for the purpose of describing example embodiments only and is not intended to be a limitation of the disclosure. In this respect, as used herein, the term "in" may include "in" and "on", and the terms "a", "an" and "the" may include singular and plural references. Furthermore, as used herein, the term "by" may also mean "from", depending on the context. Furthermore, as used herein, the term "if" may also mean "when" or "upon", depending on the context. Furthermore, as used herein, the words "and/or" may refer to and encompass any and all possible combinations of one or more of the associated listed items.

The disclosed multimedia data bitrate adaption methods are applicable to different network systems, including fixed networks, 3G mobile communication networks, WLAN networks, and WiMAX networks. The multimedia data can be either video or audio data. In the following embodiments, the multimedia data takes VoIP (audio data) into consideration, in which the VoIP may be, but not limited to, encoded with Adaptive Multi-Rate Wideband (AMR-WB) or SILK speech coding standard technology.

The multimedia data bitrate adaption methods of following embodiments may be implemented via software, hardware, or both. In one embodiment, the multimedia data bitrate adaption method may be implemented in a multimedia data transmission system.

Figure 1A:
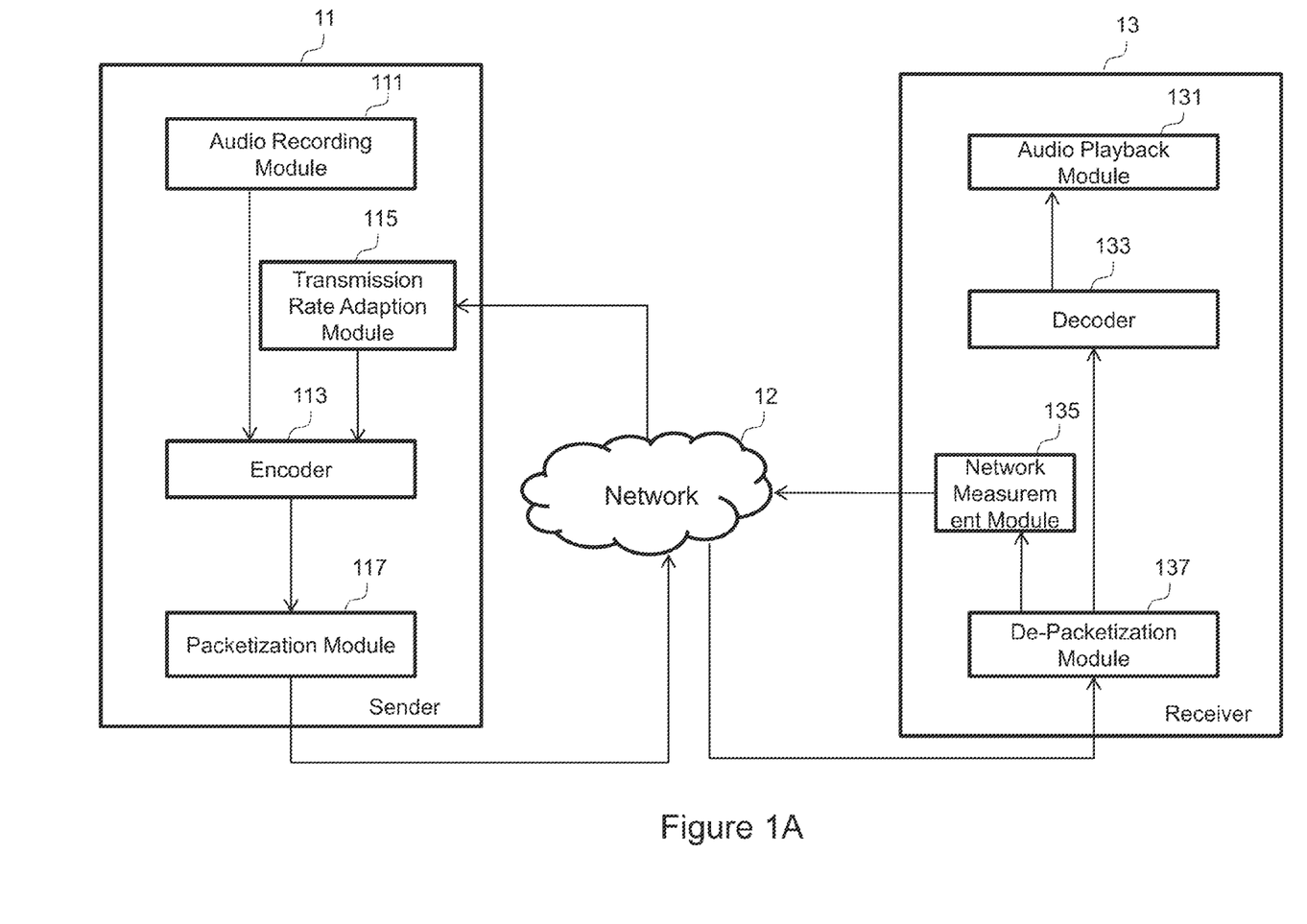
FIG. 1A depicts a block diagram illustrating a multimedia data transmission system, in accordance with an example embodiment of the present disclosure.

FIG. 1A depicts a block diagram illustrating a multimedia data transmission system 1, in accordance with an example embodiment of the present disclosure. The multimedia data transmission system 1 comprises a sender 11 and a receiver 13. The sender 11 and the receiver 13 may communicate with each other via a network 12. In practice, the sender 11 and receiver 13 may be identical, comprising the same modules, and a user could act as a sender 11, a receiver 13, or both. To describe the system 1 more specifically, FIG. 1A only illustrates some modules of sender 11 and receiver 13.

In one embodiment, the sender 11 may include an audio recording module 111, an encoder 113, a transmission rate adaptation module 115, and a packetization module 117. The receiver 13 may include an audio playback module 131, a decoder 133, a network measurement module 135, and a de-packetization module 137. Further, the audio recording module 111 may be an analog to digital converter, the audio playback module 131 may be a digital to analog converter, both the encoder 113 and the decoder 133 may be digital signal processors or codecs, and both the transmission rate adaptation module 115 and the network measurement module 135 may be microprocessor units or micro control units.

A feature of this embodiment lies on the transmission rate adaptation module 115 of the sender 11 that could be written with multimedia data transmission adaptation schedule programs in advance. The multimedia data transmission adaption schedule programs may design several predetermined bitrates in accordance with actual network bandwidth and call numbers such that the multimedia data transmission system 1 can adjust the multimedia data transmission rate between the sender 11 and the receiver 13 periodically.

Figure 1B:
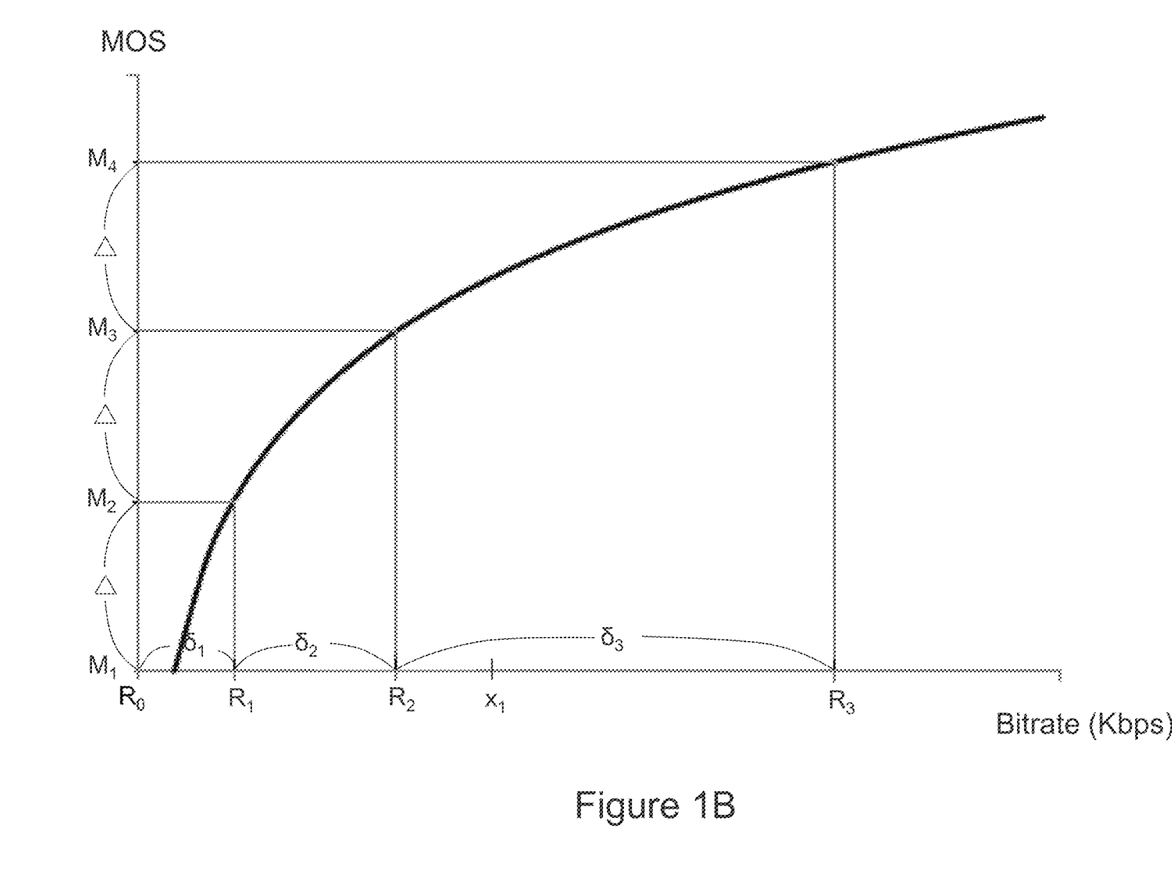
FIG. 1B depicts a characteristic curve of the bitrate and the mean opinion score (MOS) of a multimedia data bitrate adaption method, in accordance with an example embodiment of the present disclosure.

To describe the design of adaptation mechanism more specifically, please refer FIG. 1B, which depicts a characteristic curve of the bitrate and the MOS of a multi-media data bitrate adaption method in accordance with the embodiment depicted in FIG. 1A of the present disclosure. The characteristic curve of the quality of experience versus the bitrate of the multimedia data shown in FIG. 1B is a common relationship obtained from experiment, in which the quality of experience is quantized into several mean opinion scores (MOS).

As shown in FIG. 1B, the relationship between the bitrate and MOS is a logarithmic relationship following relation (1):

$$MOS = \gamma \times \ln(br - \alpha) + \beta \quad (1)$$

In relation (1), br represents the multimedia data bitrate, and $\alpha$, $\beta$, and $\gamma$ represent coefficients determined by the type of speech coding standard technologies, for example, Adaptive Multi-Rate Wideband (AMR-WB) and SILK.

To describe further simply, the relation (1) is simplified to MOS=ln br. This embodiment allocates the multi-media data bitrates into a set of predetermined bitrates $R_i$ (i=0~L) increasing with exponential multiple according to the common relationship of the bitrate of the multi-media data and the quality of experience, that is $$\frac{R_{i+1}}{R_i} = e^{\Delta}, (R_i \neq 0),$$

in which i denotes a level of the predetermined bitrates. The predetermined bitrates $R_i$ correspond to quantized MOS $M_k$ (k=1~N), respectively, wherein $\Delta = M_{k+1} - M_k$, in which MOS $M_k$ are distributed into a proportional distribution. In one embodiment, MOS $M_k$ may be 1 to 5 for representing user satisfaction degrees, in which 1 represents the worst and 5 represents the best. In another embodiment, MOS $M_k$ may be divided by N between 1 through 5, such as by 5 or 10. For example, for two adjacent predetermined bitrates $R_i$ and $R_{i+1}$, the difference $R_{i+1} - R_i = \delta_i$ and the predetermined bitrates $R_i$ and $R_{i+1}$ may satisfy the following relation (2):

$$\frac{\delta_i}{R_i} = \frac{\delta_{i+1}}{R_{i+1}} \quad (2)$$

Figure 1C:
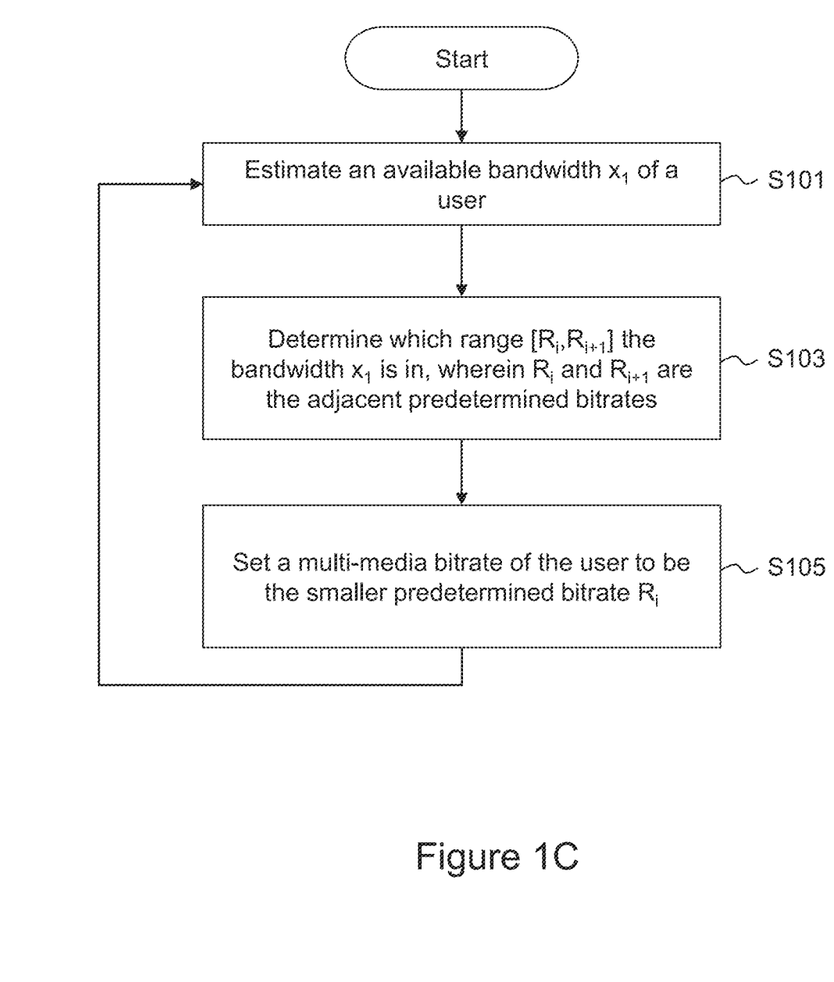
FIG. 1C depicts a flow chart of the multimedia data bitrate adaption method, in accordance with one embodiment of the present disclosure.

FIG. 1C depicts a flow chart of the multimedia data bitrate adaption method, in accordance with the embodiment depicted in FIGS. 1A and 1B of the present disclosure. Initially, the audio recording module 111 of the sender 11 may receive an analog audio signal and may convert the analog audio signal to a digital audio signal as one input signal of the encoder 113. At action S101, the transmission rate adaption module 115 may receive the information of network condition from the network measurement module 135 of the receiver 13, in which the network condition information comprises an available bandwidth $x_1$ (between the sender 11 and the receiver 13) of an user estimated by the network measurement module 135. In this embodiment, the estimated available bandwidth $x_1$ comprises the available bandwidth for uplink from the receiver 13 to the sender 11 or the available bandwidth for downlink from the sender 11 to the receiver 13. The estimation methods are generally divided into two types comprising passive and active types. The passive type method estimates the available bandwidth according to a congestion condition, such as loss rate or delay. The active type method estimates the available bandwidth by transmitting probing packets.

Subsequently, at action S103, the transmission rate adaption module 115 determines which range between two adjacent predetermined bitrates $[R_i, R_{i+1}]$ of several predetermined bitrates the available bandwidth $x_1$ is in. In practice, the transmission rate adaptation module 115 takes a series of comparison processes for the available bandwidth $x_1$ to obtain the range, and then transmits the smaller predetermined bitrate $R_i$ in the range to the encoder 113 as another input signal of the encoder 113. As shown in FIG. 1B, when the available bandwidth $x_1$ is among the predetermined bitrates $R_2$ and $R_3$ corresponding to different MOS $M_3$ and $M_4$, the transmission rate adaption module 115 transmits the smaller predetermined bitrate $R_2$ to the encoder 113. Accordingly, at action S105, the multimedia data bitrate of the user is adjusted to be the smaller predetermined bitrate $R_2$.

The encoder 113 may encode the digital audio signal into a bitstream with several segments or data fields according to the smaller predetermined bitrate $R_2$, and may transmit the bitstream to the packetization module 117. The packetization module 117 may encapsulate the bitstream to a plurality of multimedia data packets and adds a header according to a protocol stack. Therefore, the multimedia data packets may be transmitted to the receiver 13 with the smaller predetermined bitrate $R_2$.

The de-packetization module 137 of the receiver 13 may decapsulate the multi-media data packets to separate the header and the bitstream comprising the audio signal, in which the header is transmitted to the network measurement module 135 for estimating the network condition. The network measurement module 135 may transmit the estimated network condition to the transmission rate adaptation module 115, while the bitstream comprising the audio signal may be transmitted to the decoder 133 and decoded into a digital audio signal. Finally, the audio playback module 131 may return the digital audio signal to an analog audio signal for hearing by the user at the receiver 13.

Actions S101 to S105 of the multimedia data bitrate adaption method in this embodiment could be executed periodically, such as every second, in order to adjust the multimedia data bitrate according to different available bandwidths. As shown in FIG. 1B, when raising the same MOS, the user with a higher transmission rate (larger MOS) needs more bandwidth. Hence, the quality of experience for the user with a lower transmission rate tends to be higher. On the other hand, when reducing the same amount of MOS, the user with a higher transmission rate would release more bandwidth resource to avoid the bandwidth occupied by the user with higher transmission rate, and achieve fairness and raise the number of users.

Figure 2:
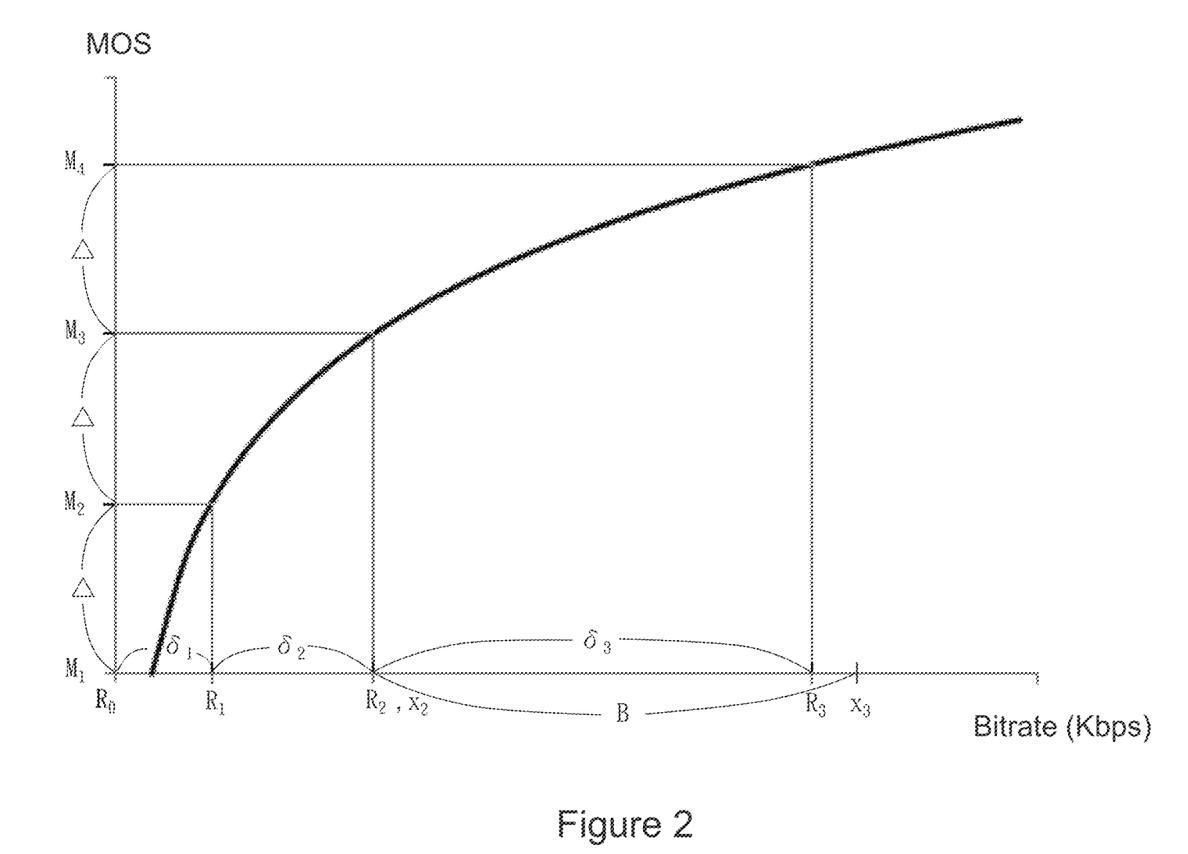
FIG. 2 depicts a characteristic curve of the bitrate and the MOS of a multimedia data bitrate adaption method, in accordance with an example embodiment of the present disclosure.

FIG. 2 depicts a characteristic curve of the bitrate and the MOS of a multi-media data bitrate adaption method in accordance with an example embodiment of the present disclosure. In contrast with the embodiment depicted in FIG. 1B, in this embodiment the multi-media data bitrate $x_2$ of the user is adjusted to be the smaller predetermined bitrate $R_2$. In addition, in this embodiment, the transmission rate adaptation module 115 may receive a current available bandwidth feedback from the network measurement module 135, and may adjust the multi-media data bitrate according to the change between the anterior available bandwidth and the current available bandwidth. When the current available bandwidth increases to be another available bandwidth $x_3$, particularly $x_3-x_2>\delta_3$, the transmission rate adaptation module 115 may adjust the anterior multi-media data bitrate $x_2$ to be the highest predetermined bitrate $R_3$ that is lower than the another available bandwidth $x_3$.

More specifically, when the increment of the available bandwidth is B, and $B>\delta_3$, that is if the multi-media data bitrate $x_2$ satisfies $$x_2 \le \frac{B}{e^\Delta - 1},$$

the multi-media data bitrate $x_2$ has chance to be adjusted to be the predetermined bitrate $R_3$ of next higher MOS $M_4$.

Figure 3:
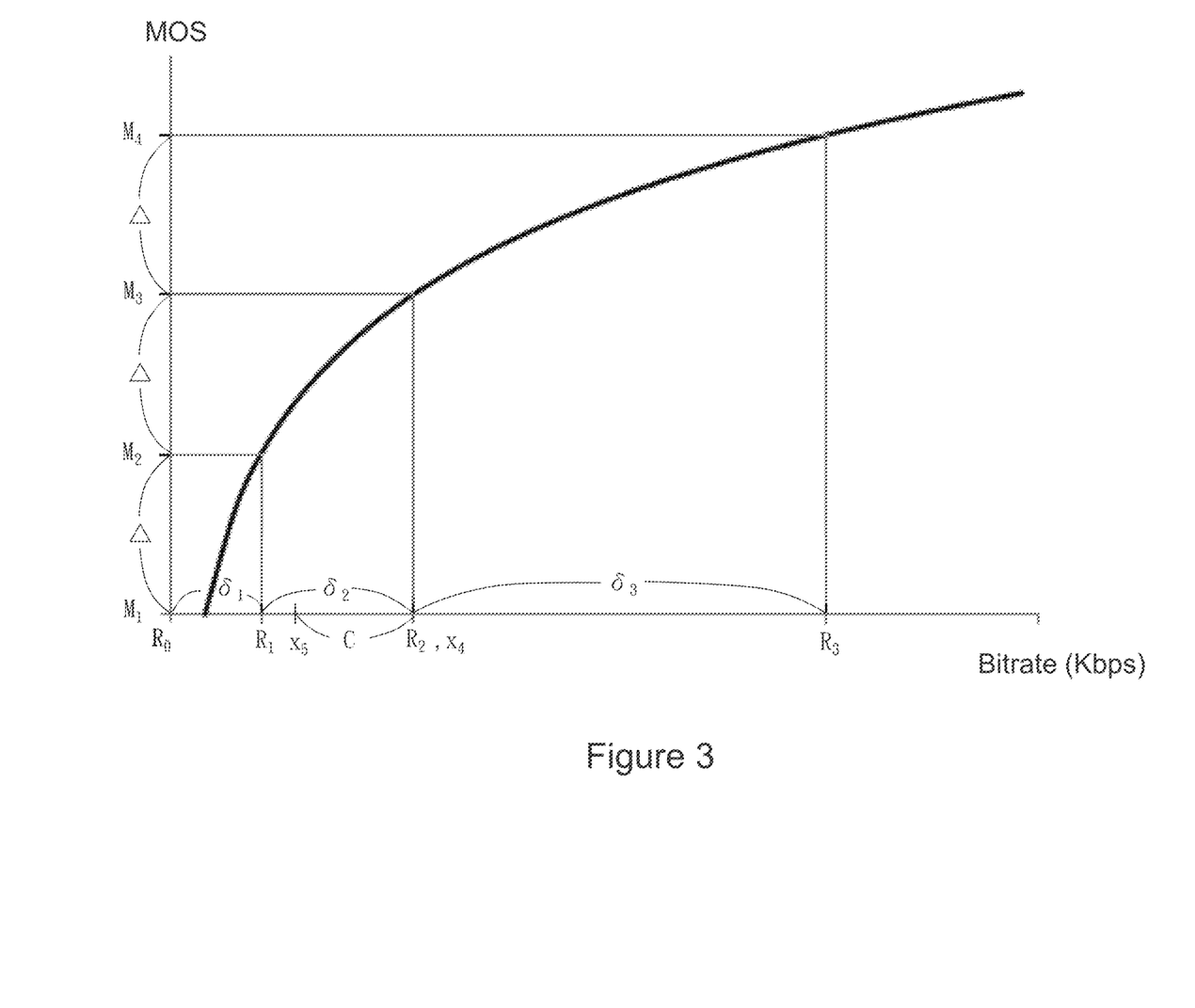
FIG. 3 depicts a characteristic curve of the bitrate and the MOS of a multimedia data bitrate adaption method, in accordance with an example embodiment of the present disclosure.

FIG. 3 depicts a characteristic curve of the bitrate and the MOS of a multimedia data bitrate adaption method, in accordance with an example embodiment of the present disclosure. This embodiment is similar to the embodiment depicted in FIG. 1B. In this embodiment, however, after the multimedia data bitrate $x_4$ of the user is adjusted to be the smaller predetermined bitrate $R_2$, the transmission rate adaptation module 115 may further receive a current available bandwidth feedback from the network measurement module 135 and may adjust the multimedia data bitrate according to the change between the anterior available bandwidth and the current available bandwidth. When the current available bandwidth decreases to another available bandwidth $x_5$, particularly $x_5-x_4<0$ and $x_5-x_4=C<\delta_2$, the transmission rate adaptation module 115 may adjust the anterior multimedia data bitrate $x_4$ to be another predetermined bitrate $R_1$ that is lower than the another available bandwidth $x_5$.

According to above-mentioned embodiments of data bitrate adaptation mechanism, the multimedia data transmission rates can be divided into several levels corresponding to several predetermined data bitrates $R_i$ and exponentially distributed. When the above-mentioned data bitrate adaptation mechanism is applied to multiple users simultaneously, the exponential relationship of the predetermined data bitrates $R_i$ can ensure the resource allocation balance under proportional fairness to improve the fairness and performance for all system users.

Figure 4:
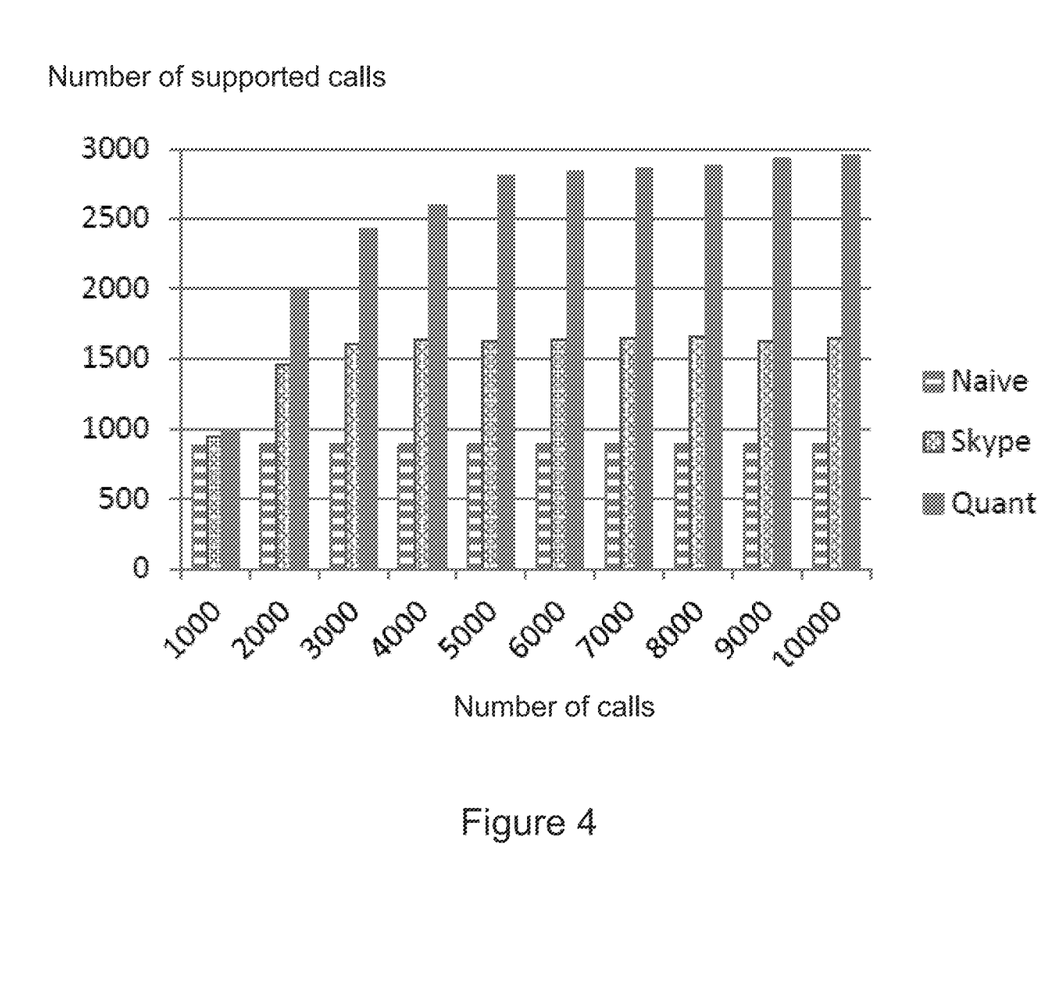
FIG. 4 depicts a simulation bar diagram of the number of calls and the number of supported calls of a multimedia data bitrate adaption method, in accordance with an example embodiment of the present disclosure.
Figure 5:
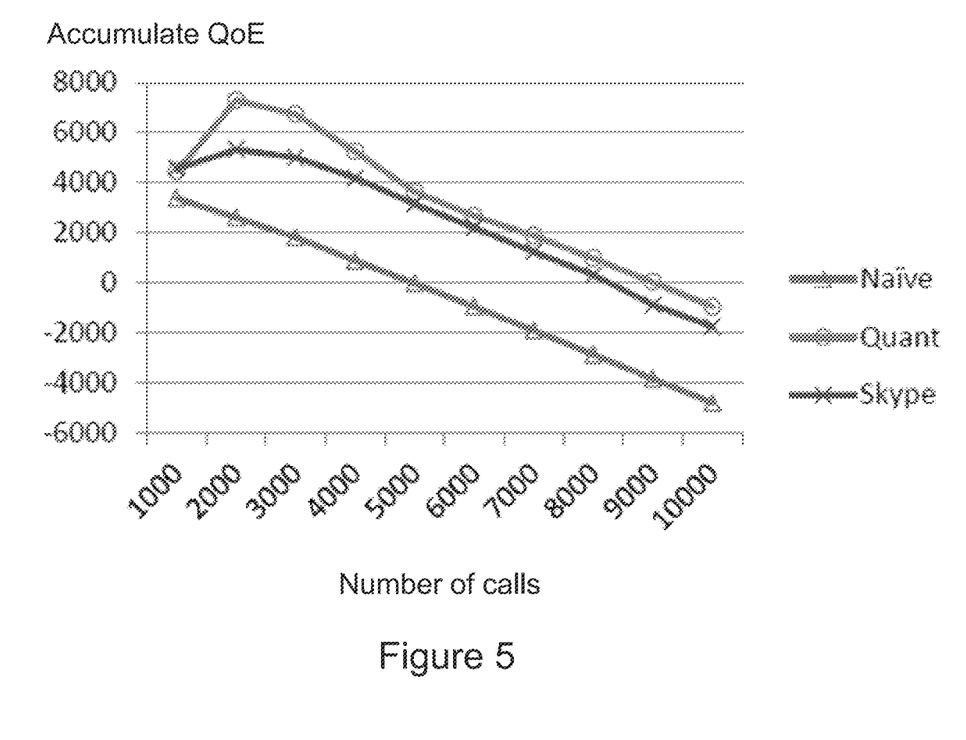
FIG. 5 depicts a simulation characteristic curve of the number of calls and the accumulated quality of experience (QoE) of a multi-media data bitrate adaption method, in accordance with an example embodiment of the present disclosure.
Figure 6:
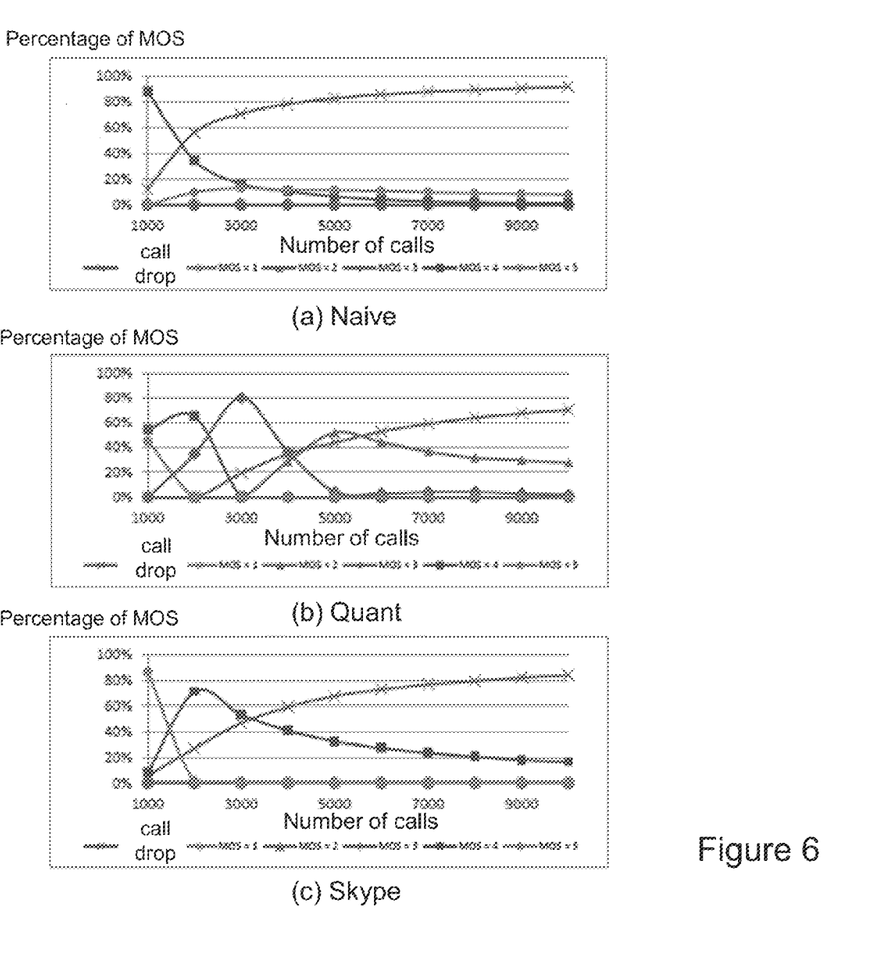

To prove that the above-mentioned data bitrate adaptation mechanism could improve service capacity and customer satisfaction, please refer to FIGS. 4 to 6. FIG. 4 depicts a simulation bar diagram of the number of calls and the number of supported calls of a multimedia data bitrate adaption method, in accordance with an example embodiment of the present disclosure. The number of calls comprises the number of calls at the same period of time or the number of calls between two users.

As shown in FIG. 4, three rate control mechanisms, including Naïve, Quant (represents the above-mentioned data bitrate adaptation), and Skype mechanisms, are taken into consideration to compare their service capacity between 1,000 and 10,000 calls. The numbers of supported calls with these three mechanisms broadly increases with increasing number of calls. It is noted, however, that with the Naïve mechanism, the bandwidth difference between a first time t and a second time t-1 is shared uniformly by all calls. This simulation result reveals that the Naïve mechanism has the least number of supported calls over time, whereas the number of supported calls of the Skype mechanism increases with increasing number of calls, and the Quant mechanism has more supported calls when compared with the Naïve mechanism and the Skype mechanism.

FIG. 5 depicts a simulation characteristic curve of the number of calls and the accumulated quality of experience (QoE) of a multimedia data bitrate adaption method, in accordance with an example embodiment of the present disclosure. It also takes the above-mentioned mechanisms to compare the accumulated quality of experiences under different number of calls. This simulation result reveals that the accumulated QoE of these three mechanisms broadly decrease with increasing number of calls. It is noted that the accumulated QoE of the Naïve mechanism has the most decrement, and the accumulated QoE of the Quant and Skype mechanisms initially increase with the number of calls, but decrease after the network is saturated, as there are too many calls or the number of calls exceed 2,000 calls.

FIGS. 6(a)-(c) depict simulation characteristic curves of the number of calls and the percentage of MOS for three different VoIP data bitrate adaption mechanisms, in accordance with an example embodiment of the present disclosure. As shown in FIGS. 6(a)-(c), the percentage of different MOS (MOS=1~5) of the above-mention mechanisms varies with different number of calls.

FIG. 6(a) depicts that the Naïve mechanism with MOS=5 becomes the main percentage of MOS with increasing number of calls. In other words, the Naïve mechanism does not adjust the transmission rate dynamically, such that the percentage of calls dropped increases with an increasing number of calls.

FIG. 6(b) depicts that the percentage distributions of MOS of the Quant mechanism have different peak distributions (peak shift). In the other words, the main percentage of MOS varies with increasing number of calls such that more calls are allowed to join.

FIG. 6(c) depicts that the Skype mechanism with MOS=4 becomes the main percentage of MOS with an increasing number of calls. The percentage of MOS=4 decreases gradually with increasing number of calls since the amount of call drop increases.

At least one advantage of the multimedia data bitrate adaption method described herein has the ability of providing a network transmission rate allocation schedule. By periodically estimating the available bandwidth and comparing the available bandwidth and the current data transmission rate, the present method can release more bandwidth resources from calls with higher transmission bitrates and maintain network service performance. Therefore, a user's call with lower data transmission rates does not tend to be squeezed out and the data transmission rate tends to be raised related to a call with higher data transmission rates so as to service the maximum number of users.

Realizations in accordance with the present disclosure have been described in the context of particular embodiments. These embodiments are meant to be illustrative and not limiting. Many variations, modifications, additions, and improvements are possible. Accordingly, plural instances may be provided for components described herein as a single instance. Structures and functionality presented as discrete components in the exemplary configurations may be implemented as a combined structure or component. These and other variations, modifications, additions, and improvements may fall within the scope of the invention as defined in the claims that follow.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Field of the Disclosure," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

What is claimed is:

1. A multi-media data bitrate adaption method applied in a multi-media data transmission system, comprising:
    estimating an available bandwidth between a sender and a receiver;
    determining which range between two adjacent predetermined bitrates of several predetermined bitrates the available bandwidth is in;
    setting a multi-media data bitrate between the sender and the receiver to be the smaller predetermined bitrate of the two adjacent predetermined bitrates; and
    determining changes in the available bandwidth, and when the available bandwidth increases to a higher available bandwidth, adjusting the multi-media bitrate to the highest predetermined bitrate that is lower than the higher available bandwidth;
    wherein the predetermined bitrates are exponentially distributed and correspond to different qualities of experiences quantized into different proportionally distributed mean opinion scores of user satisfactions.

2. The method according to claim 1, wherein the multi-media data is a voice over internet protocol data.

3. The method according to claim 2, wherein the voice over internet protocol data is encoded with Adaptive Multi-Rate Wideband (AMR-WB) speech coding standard technology.

4. The method according to claim 2, wherein the voice over internet protocol data is encoded with SILK speech coding standard technology.

5. The method according to claim 1, further comprising:
    when the available bandwidth decreases to a lower available bandwidth, adjusting the multi-media data bitrate to be another predetermined bitrate that is lower than the lower available bandwidth.

6. A voice over internet protocol data bitrate adaption method applied in a multi-media data transmission system, comprising:
    estimating an available bandwidth between a sender and a receiver;
    determining which range between two adjacent predetermined bitrates of several predetermined bitrates the available bandwidth is in;
    setting a voice over internet protocol data bitrate between the sender and the receiver to be the smaller predetermined bitrate of the two adjacent predetermined bitrates; and
    determining changes in the available bandwidth, and when the available bandwidth increases to a higher available bandwidth, adjusting the voice over internet protocol bitrate to the highest predetermined bitrate that is lower than the higher available bandwidth;
    wherein the predetermined bitrates are exponentially distributed and correspond to different qualities of experiences quantized into different proportionally distributed mean opinion scores of user satisfactions.

7. The method according to claim 6, wherein the voice over internet protocol data is encoded with Adaptive Multi-Rate Wideband (AMR-WB) speech coding standard technology.

8. The method according to claim 6, wherein the voice over internet protocol data is encoded with SILK speech coding standard technology.

9. The method according to claim 1, further comprising:
when the available bandwidth decreases to a lower available bandwidth, adjusting the voice over internet protocol data bitrate to be another predetermined bitrate that is lower than the lower available bandwidth.

* * * * *